(12) United States Patent
Jing

(10) Patent No.: US 9,671,258 B2
(45) Date of Patent: Jun. 6, 2017

(54) WEARABLE DEVICE WITH REMOVAL-DETECTION FUNCTION

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventor: Ren-Qiang Jing, Shenzhen (CN)

(73) Assignees: HONGFUJIN PRECISIOIN ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/790,688

(22) Filed: Jul. 2, 2015

(65) Prior Publication Data

US 2016/0153761 A1 Jun. 2, 2016

(30) Foreign Application Priority Data

Nov. 28, 2014 (CN) .......................... 2014 1 0700803

(51) Int. Cl.
| | | |
|---|---|---|
| *G01B 7/14* | (2006.01) | |
| *G01D 5/20* | (2006.01) | |
| *G01D 21/00* | (2006.01) | |
| *G08B 21/02* | (2006.01) | |
| *G01D 5/24* | (2006.01) | |

(52) U.S. Cl.
CPC ......... *G01D 21/00* (2013.01); *G08B 21/0269* (2013.01); *G08B 21/0286* (2013.01); *G01D 5/24* (2013.01)

(58) Field of Classification Search
CPC .................................... G01B 7/14; G01D 5/20
See application file for complete search history.

(56) References Cited

U.S. PATENT DOCUMENTS

| | | | | |
|---|---|---|---|---|
| 6,608,562 B1 * | 8/2003 | Kimura | .............. | A61B 5/02427 128/903 |
| 2006/0109135 A1 * | 5/2006 | Donat | ................. | G07C 9/00111 340/686.6 |
| 2013/0187789 A1 * | 7/2013 | Lowe | ..................... | G08C 19/16 340/870.02 |

* cited by examiner

*Primary Examiner* — Jermele M Hollington
*Assistant Examiner* — Zannatul Ferdous
(74) *Attorney, Agent, or Firm* — Steven Reiss

(57) ABSTRACT

A wearable device with removal-detection function includes a component, a copper foil, a wireless communication circuit, and a monitoring unit. The copper foil is arranged in the component. An induction capacitor is formed between the copper foil and user's body when the component is in contact with user's body. The monitoring unit measures electrical characteristics of the induction capacitor, and can determine a removal from user's body based on the measured electrical characteristics. The monitoring unit further controls the wireless communication circuit to send a warning message plus location information to a monitoring terminal if the wearable device is removed.

9 Claims, 2 Drawing Sheets

WEARABLE DEVICE WITH REMOVAL-DETECTION FUNCTION

CROSS-REFERENCE TO RELATED APPLICATIONS

This application claims priority to Chinese Patent Application No. 201410700803.8 filed on Nov. 28, 2014, the contents of which are incorporated by reference herein.

FIELD

The subject matter herein generally relates to wearable devices with removal-detection function.

BACKGROUND

Wearable devices can be worn on wrists of people in vulnerable groups, such as children or old men, to monitor or locate the person. The wearable device can be in the form of a watch. The wearable device can also be an exercise device or a compass device.

BRIEF DESCRIPTION OF THE DRAWINGS

Implementations of the present disclosure will now be described, by way of example only, with reference to the attached figures.

DETAILED DESCRIPTION

Figure 1:
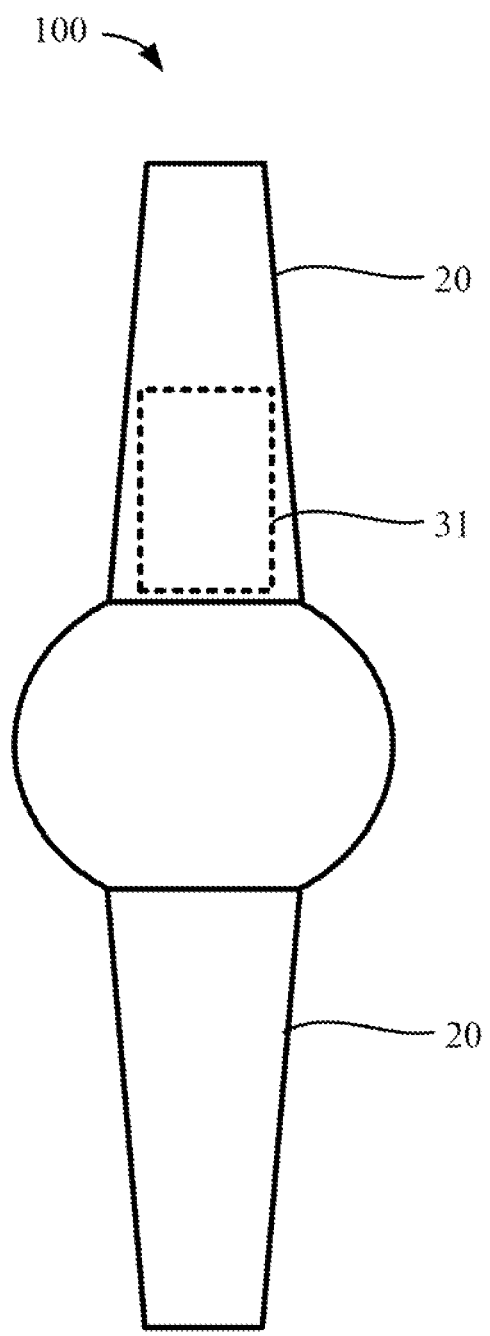
FIG. 1 is a diagrammatic view of one embodiment of a wearable device with removal-detection function.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features. The present disclosure, including the accompanying drawings, is illustrated by way of examples and not by way of limitation.

Several definitions that apply throughout this disclosure will now be presented.

References to "a/an" or "one" embodiment in this disclosure are not necessarily to the same embodiment, and such references mean "at least one." The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

Figure 2:
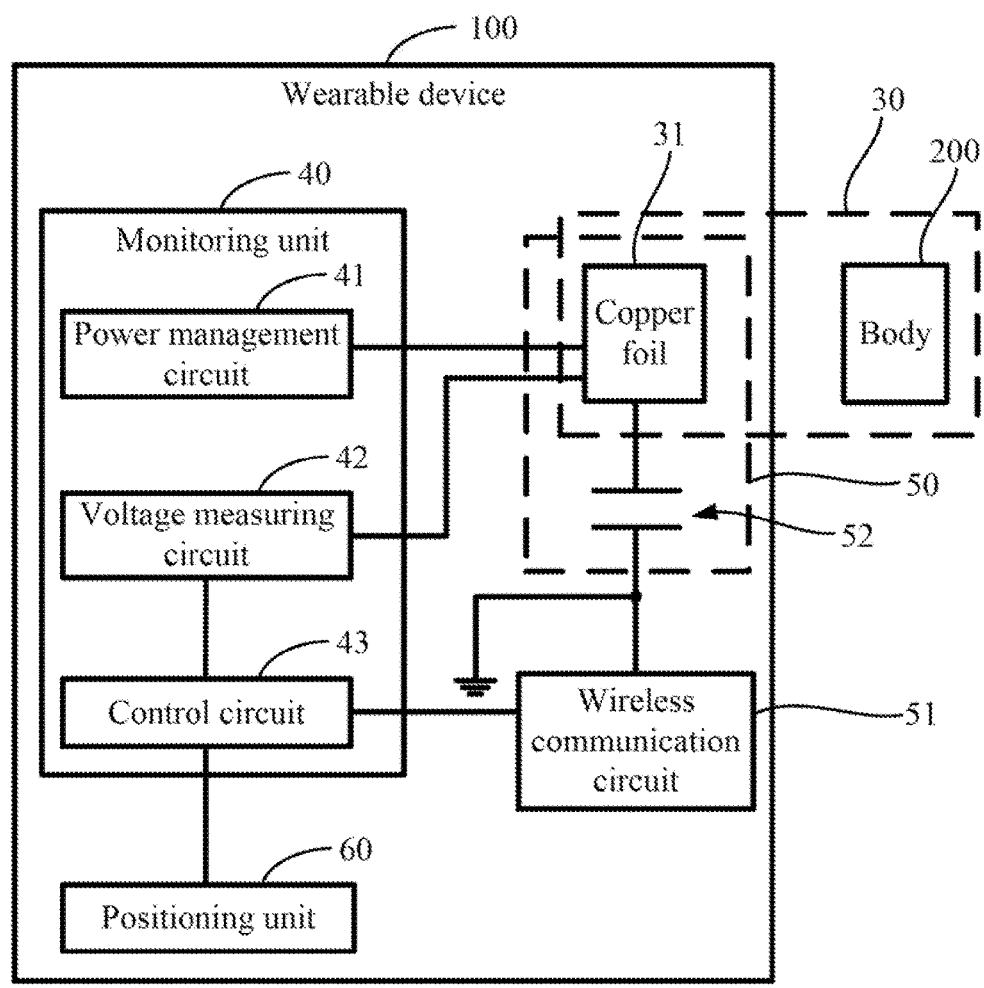
FIG. 2 is a block diagram of one embodiment of the wearable device with removal-detection function of FIG. 1.

FIG. 1 is a diagrammatic view of one embodiment of a wearable device with removal-detection function. In the illustrated embodiment shown in FIG. 1, a wearable device 100 includes, but is not limited to, a component 20 and a copper foil 31 arranged in the component 20. In the embodiment, the wearable device 100 can be in the form of a watch, an exercise device or a compass device. The component 20 can be a strap so the device 100 that contacts user's body 200 (as shown in FIG. 2), around the wrist or neck. In the illustrated embodiment, the copper foil 31 has a predetermined area S.

FIG. 2 shows that when the component 20 is in contact with user's body 200, an induction capacitor 30 is formed between the copper foil 31 and user's body 200. That is, the copper foil 31 constitutes one electrode of the induction capacitor 30, and user's body 200 constitutes the other electrode of the induction capacitor 30.

In the illustrated embodiment, the wearable device 100 further includes a wireless communication circuit 51 and a bridging capacitor 52. In the illustrated embodiment, the bridging capacitor 52 is electrically coupled between the wireless communication circuit 51 and the copper foil 31.

In the illustrated embodiment, the bridging capacitor 52 and the copper foil 31 cooperate to form a wireless communication antenna 50, and the wireless communication antenna 50 and the wireless communication circuit 51 cooperate to constitute a wireless communication unit, such as Global System for Mobile Communications (GSM) unit, a WIFI unit, or a BLUETOOTH unit. In the illustrated embodiment, the wireless communication circuit 51 is a radio frequency circuit, and the wireless communication antenna 50 is a radio frequency antenna.

In the illustrated embodiment, the wearable device 100 further includes a monitoring unit 40 which is electrically coupled to the copper foil 31. The monitoring unit 40 is configured to measure electrical characteristics of the induction capacitor 30 and determine whether the wearable device 100 has been removed from user's body 200 based on the measured electrical characteristics.

In the illustrated embodiment, the monitoring unit 40 includes a power management circuit 41, a voltage measuring circuit 42, and a control circuit 43. In the illustrated embodiment, the power management circuit 41 and the voltage measuring circuit 42 are both electrically coupled to the copper foil 31. The power management circuit 41 is configured to charge or discharge the induction capacitor 30, and to maintain a stable electrical quantity Q in the induction capacitor 30. The voltage measuring circuit 42 is configured to measure a voltage value V of a surface of the copper foil 31. In the illustrated embodiment, the measurable electrical characteristic of the induction capacitor 30 is the voltage value V of the surface of the copper foil 31.

The control circuit 43 is electrically coupled to the voltage measuring circuit 42 and the wireless communication circuit 51. The control circuit 43 is configured to determine whether or not the measured voltage value V is greater than a preset value. The control circuit 43 will determine that the wearable device 100 has been removed from user's body 200 if the measured voltage value is greater than the preset value.

In the illustrated embodiment, the capacitance value C of the induction capacitor 30 is calculated by the formula $C=\epsilon*\epsilon_0*S/d$, wherein $\epsilon$ and $\epsilon_0$ are both constants, S is the predetermined area S of the copper foil 31, and d is a distance between two electrodes of the induction capacitor 30, that is the distance between the copper foil 31 and user's body 200. The electrical quantity Q is calculated by the formula $Q=C*V=(\epsilon*\epsilon_0*S*V)/d$. Therefore, if the predetermined area S of the copper foil 31 is a constant, the measured voltage value V is proportional to the distance d between the two electrodes of the induction capacitor 30. That is, a change of the distance d will cause a change of the measured voltage value V.

When the wearable device 100 is being worn, the copper foil 31 is close to user's body 200, the distance d is smaller, and the measured voltage value V is thus smaller. Conversely, when the user takes off the wearable device 100, or when it is removed, the copper foil 31 moves away from user's body 200, the distance d is increased, and the measured voltage value V is thus increased. Therefore, the control circuit 43 can determine whether the wearable device 100 has been removed from user's body 200 by determining whether the measured voltage value V is greater than a preset value.

In the illustrated embodiment, the monitoring unit 40 is further configured to control the wireless communication circuit 51 to send a warning message to a monitoring terminal (not shown), such as a server or a mobile phone of a designated party, if the wearable device 100 is determined to be removed from user's body 200.

In the illustrated embodiment, the wireless communication circuit 51 includes a main antenna (not shown), and the wireless communication antenna 50 is used as a slave antenna of the wireless communication circuit 51, to improve transmission performance. In the illustrated embodiment, one electrode of the bridging capacitor 52 coupled to the wireless communication circuit 51 is grounded. With such configuration, the copper foil 31 is indirectly grounded via the bridging capacitor 52, in order to meet circuit configuration requirements for a slave antenna which transmits an alternating current signal having a high frequency, such as a GSM signal having frequency of 850 MHZ/900 MHZ, or a WIFI signal having frequency of 2.45 GHZ. On the other hand, the copper foil 31 is not directly grounded because of the addition of the bridging capacitor 52, which has no effect on the electrical characteristics of the copper foil 31 Therefore, the addition of the bridging capacitor 52 meets the removal-detecting function requirement, which needs to measure the voltage value of the copper foil 31.

In the illustrated embodiment, the wearable device 100 further includes a positioning unit 60 coupled to the control circuit 43. The positioning unit 60 is configured to determine the location of the wearable device 100. In the illustrated embodiment, the control circuit 43 is further configured to control the positioning unit 60 to determine the location of the wearable device 100 when the wearable device 100 is determined to be no longer in place on user's body 200. In the illustrated embodiment, the warning message includes the location of the wearable device 100.

In the illustrated embodiment, the positioning unit 60 can be a Global Positioning System (GPS) unit. The monitoring unit can be a Micro Controller Unit (MCU) chip, such as a chip MSP430G of the TI Company. In other embodiments, the wireless communication circuit 51 is integrated into the monitoring unit 40.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. A wearable device with removal-detection function comprising:
    a component configured to be worn on user's body;
    a copper foil arranged in the component and forming an induction capacitor between the copper foil and user's body when the component is in contact with user's body;
    a wireless communication circuit electrically coupled to the copper foil;
    a bridging capacitor electrically coupled between the wireless communication circuit and the copper foil, wherein the bridging capacitor and the copper foil cooperate to form a wireless communication antenna, the wireless communication antenna and the wireless communication circuit cooperate to constitute a wireless communication unit; and
    a monitoring unit electrically coupled to the copper foil, the monitoring unit configured to:
        measure electrical characteristics of the induction capacitor;
        determine whether the wearable device has been removed from user's body based on the measured electrical characteristics, and control the wireless communication circuit to send a warning message to a monitoring terminal, if the wearable device is determined to be removed from user's body.

2. The wearable device with removal-detection function as described in claim 1, wherein the monitoring unit further comprising:
    a power management circuit electrically coupled to the copper foil, the power management circuit configured to charge or discharge the induction capacitor, to maintain a stable electrical quantity in the induction capacitor;
    a voltage measuring circuit electrically coupled to the copper foil and configured to measure a voltage value of a surface of the copper foil, wherein the measurable electrical characteristic of the induction capacitor is the voltage value of the surface of the copper foil; and
    a control circuit electrically coupled to the voltage measuring circuit, the control circuit configured to determine that the wearable device has been removed from user's body if the measured voltage value is greater than a preset value.

3. The wearable device with removal-detection function as described in claim 2, further comprising a positioning unit configured to determine the location of the wearable device, wherein the warning message comprises the location of the wearable device;
    wherein the control circuit is electrically coupled to the positioning unit and the wireless communication circuit, the control circuit is further configured to control the positioning unit to determine the location of the wearable device when the wearable device is determined to be no longer in place on user's body.

4. The wearable device with removal-detection function as described in claim 3, wherein the positioning unit is a Global Positioning System (GPS) unit.

5. The wearable device with removal-detection function as described in claim 2, wherein the monitoring unit is a Micro Controller Unit (MCU) chip.

6. The wearable device with removal-detection function as described in claim 1, wherein the wireless communication circuit is integrated into the monitoring unit.

7. The wearable device with removal-detection function as described in claim 1, wherein the wireless communication antenna is used as a slave antenna of the wireless communication circuit, to improve transmission performance.

8. The wearable device with removal-detection function as described in claim 7, wherein one electrode of the bridging capacitor coupled to the wireless communication circuit is grounded, such that the copper foil is indirectly grounded via the bridging capacitor, to meet circuit configuration requirements for the slave antenna to transmit an alternating current signal having a high frequency.

9. The wearable device with removal-detection function as described in claim 1, wherein a electrical quantity Q in the induction capacitor is calculated by a formula $Q=(\epsilon * \epsilon 0 * S * V)/d$, wherein "$\epsilon$" and "$\epsilon 0$" are both constants, "S" is a predetermined area of the copper foil, "d" is a distance between the copper foil and the user's body, and "V" is a voltage value of a surface of the copper foil.

\* \* \* \* \*